US 12,477,005 B2

(12) United States Patent
Jeong et al.

(10) Patent No.: US 12,477,005 B2
(45) Date of Patent: *Nov. 18, 2025

(54) METHOD AND SYSTEM FOR PERFORMING SECURITY MANAGEMENT AUTOMATION IN CLOUD-BASED SECURITY SERVICES

(71) Applicant: RESEARCH & BUSINESS FOUNDATION SUNGKYUNKWAN UNIVERSITY, Suwon-si (KR)

(72) Inventors: Jae Hoon Jeong, Busan (KR); Patrick Lingga, Suwon-si (KR); Jung Soo Park, Daejeon (KR); Yun Chul Choi, Sejong-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 312 days.

This patent is subject to a terminal disclaimer.

(21) Appl. No.: 17/517,105

(22) Filed: Nov. 2, 2021

(65) Prior Publication Data

US 2022/0141256 A1 May 5, 2022

(30) Foreign Application Priority Data

Nov. 2, 2020 (KR) .................. 10-2020-0144823
Feb. 22, 2021 (KR) .................. 10-2021-0023651
Nov. 2, 2021 (KR) .................. 10-2021-0149158

(51) Int. Cl.
*H04L 9/40* (2022.01)
*G06F 16/22* (2019.01)
(Continued)

(52) U.S. Cl.
CPC .......... *H04L 63/20* (2013.01); *G06F 16/2246* (2019.01); *G06F 16/27* (2019.01); *H04L 67/1097* (2013.01)

(58) Field of Classification Search
CPC ..... H04L 63/20; H04L 67/1097; G06F 16/27; G06F 16/2246
(Continued)

(56) References Cited

U.S. PATENT DOCUMENTS

2023/0094541 A1* 3/2023 Gai .................. G06F 16/13
713/189

FOREIGN PATENT DOCUMENTS

| CN | 110297750 A | * | 10/2019 | |
| CN | 110460461 A | * | 11/2019 | .......... G06F 8/30 |

(Continued)

OTHER PUBLICATIONS

Hong et al., A Monitoring-based Load Balancing Scheme for Network Security Functions, 2017, 978-1-5090-4032-2, 668-672 (Year: 2017).*

(Continued)

*Primary Examiner* — Moeen Khan
(74) *Attorney, Agent, or Firm* — NSIP Law

(57) ABSTRACT

A method of performing a security management automation in an Interface to Network Security Functions (I2NSF) system is disclosed. The method comprises receiving a high-level security policy via a consumer-facing interface; translating the high-level security policy into a low-level security policy based on an automatic mapping model; transmitting the low-level security policy to a network security function (NSF) via an NSF-facing interface, wherein the low-level security policy is applied to a system of the NSF; receiving monitoring data for a network security from the NSF; reconfiguring a security policy based on the monitoring data; and transmitting the reconfigured security policy to the NSF via the NSF-facing interface. The reconfigured security policy is updated to a system of the NSF.

6 Claims, 10 Drawing Sheets

(51) Int. Cl.
*G06F 16/27* (2019.01)
*H04L 67/1097* (2022.01)

(58) Field of Classification Search
USPC .............................................. 726/1
See application file for complete search history.

(56) References Cited

FOREIGN PATENT DOCUMENTS

| | | |
|---|---|---|
| KR | 10-2001-0085056 A | 9/2001 |
| KR | 101863236 B1 * | 6/2018 |
| KR | 10-2020-0003738 A | 1/2020 |
| KR | 10-2020-0045400 A | 5/2020 |

OTHER PUBLICATIONS

Yang et al., An Automata-based Security Policy Translation for Network Security Functions, 2018, 978-1-5386-5041-7, 286-272 (Year: 2018).*
Korean Office Action issued on Apr. 11, 2023, in counterpart Korean Patent Application No. 10-2021-0149158 (4 pages in Korean).
Korean Office Action issued on Oct. 12, 2023, in counterpart Korean Patent Application No. 10-2021-0149158 (7 pages in Korean).

* cited by examiner ated herein by reference for all purposes as if fully set forth
METHOD AND SYSTEM FOR PERFORMING SECURITY MANAGEMENT AUTOMATION IN CLOUD-BASED SECURITY SERVICES This application claims the priority benefit of Korean Patent Applications No. 10-2020-0144823, filed on Nov. 2, 2020, No. 10-2021-0023651, filed on Feb. 22, 2021, and No. 10-2021-0149158, filed on Nov. 2, 2021, which is incorporated herein by reference for all purposes as if fully set forth herein.

TECHNICAL FIELD

The present disclosure relates to an extension for update and creation of a security policy for monitoring and security attack for security management automation in a framework of Interface to Network Security Functions (I2NSF) as a cloud-based security service system.

BACKGROUND

In an existing cloud-based security service system, if a new security attack is found, it collects a pattern of the security attack and security attacker's IP address, and a security manager manually creates a new security policy and delivers it to a cloud security service system. There is a problem in that the manual basis causes a delay in defense against security attack that is not previously configured in the system. In addition, because a person called the security manager intervenes, there is a problem in that there is a delay in propagating the new security policy to other clouds when there is a new security attack.

SUMMARY

The present disclosure provides a security management automation applicable to a cloud-based security service system by collecting in real-time monitoring data from a virtual machine and a network switch performing cloud-based security services, analyzing the monitoring data by machine learning to find timely a new security attack, and updating the existing security policy or creating a new security policy to respond to the security attack.

The present disclosure also provides a feedback structure applied to a security service system by applying a security policy to a security service virtual machine according to a security service user's intention using an intent-based networking (IBN) technology, monitoring in real time the security service virtual machine and a network switch, finding a security attack through machine learning-based monitoring data analysis, and creating a security policy responding to the security attack.

In one aspect of the present disclosure, there is provided a method of performing a security management automation in an Interface to Network Security Functions (I2NSF) system, the method comprising receiving a high-level security policy via a consumer-facing interface; translating the high-level security policy into a low-level security policy based on an automatic mapping model; transmitting the low-level security policy to a network security function (NSF) via an NSF-facing interface, wherein the low-level security policy is applied to a system of the NSF; receiving monitoring data for a network security from the NSF; reconfiguring a security policy based on the monitoring data; and transmitting the reconfigured security policy to the NSF via the NSF-facing interface, wherein the reconfigured security policy is updated to the system of the NSF.

The translating comprises extracting attribute information related to the security policy from the high-level security policy; mapping the attribute information of the high-level security policy to corresponding attribute information of the low-level security policy; and creating the low-level security policy based on a result of mapping.

The mapping comprises converting a high-level Yet Another Next Generation (YANG) data model and a low-level YANG data model into a tree graph; converting the tree graph into a non-branch tree; calculating a tree edit distance between a high-level graph and a low-level graph based on Zhang-Shasha algorithm; obtaining a minimum value of the tree edit distance; and creating the automatic mapping model from the tree edit distance.

The mapping comprises constructing a mapping table that associates data attributes or variables of a high-level YANG data module with corresponding data attributes or variables of a low-level YANG data module. A set of production rules for context free grammar for construction of rules of the low-level security policy is generated based on the mapping table.

The low-level security policy includes a specific security service, and the specific security service includes at least one of a firewall, a web filter, a deep packet inspection, a DDos-attack mitigation, and an anti-virus.

The I2NSF system applies a network management or verification facility by a decentralized audit system, and a blockchain technology is applied to the decentralized audit system.

In another aspect of the present disclosure, there is provided an Interface to Network Security Functions (I2NSF) system performing a security management automation, the I2NSF system comprising a security controller configured to receive a high-level security policy and translate the high-level security policy into a low-level security policy; an I2NSF analyzer configured to receive monitoring data for a network security from at least one network security function (NSF) component and reconfigure a security policy based on the monitoring data; the security controller configured to transmit the reconfigured security policy to the at least one NSF component; and the at least one NSF component configured to apply the reconfigured security policy to an NSF system.

The security controller is further configured to extract attribute information related to the security policy from the high-level security policy; map the attribute information of the high-level security policy to corresponding attribute information of the low-level security policy; and create the low-level security policy based on a result of mapping.

The security controller is further configured to convert a high-level YANG data model and a low-level YANG data model into a tree graph; convert the tree graph into a non-branch tree; calculate a tree edit distance between a high-level graph and a low-level graph based on Zhang-Shasha algorithm; obtain a minimum value of the tree edit distance; and create an automatic mapping model from the tree edit distance.

The security controller is further configured to construct a mapping table that associates data attributes or variables of a high-level YANG data module with corresponding data attributes or variables of a low-level YANG data module. A set of production rules for context free grammar for construction of rules of the low-level security policy is generated based on the mapping table.

The feedback structure can provide security service automation in an I2NSF framework. The automation can efficiently manage a cloud-based security service by quickly responding to a new security attack and automatically creating a security policy for the security attack to apply it to a security service system.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

DETAILED DESCRIPTION

Hereinafter, preferred embodiments of the present disclosure will be described in detail with reference to the accompanying drawings. The detailed description that will be provided with the accompanying drawings is provided to explain exemplary embodiments of the present disclosure and is not intended to unique embodiments that can implement the present disclosure. The following detailed description includes details to help complete understand the present disclosure. However, those skilled in the art know that the present disclosure can be implemented even without the details.

In some cases, well-known structures and devices may be omitted or the important capability of each structure and device may be shown in a block diagram type to avoid making the concept of the present disclosure unclear.

Specific terms that are used in the following description are provided to help understand the present disclosure, and use of these specific terms may be changed in other ways without departing from the technical spirit of the present disclosure.

Recently, a fundamental standard interface for an NFV-based security function is developed by an NFV-based security function working group. This is a portion of the international internal standard organization called an IETF (Internet Engineering Task Force).

The object of the I2NSF is for defining a standardized interface for a heterogeneous network security function (NSF) provided by several security solution vendors.

In an I2NSF architecture, without considering management of an NSF in detail (management of NSF requires enforcement of a security policy), a user can define a protection policy for protecting network resources in a network system. Further, an interface standardized to an NSF(s) from several vendors can simplify setting and managing of tasks for a heterogeneous NSF(s).

Figure 1:
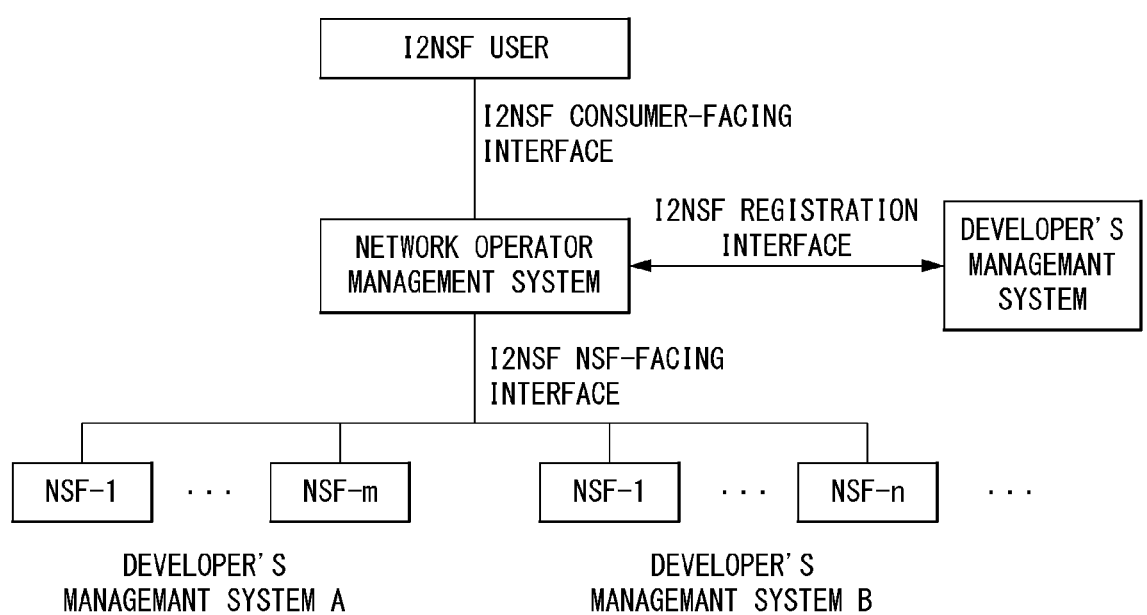
FIG. 1 illustrates an Interface to Network Security Functions (I2NSF) system, as an embodiment to which the present disclosure is applied.

FIG. 1 illustrates an I2NSF (Interface to Network Security Functions) system, as an embodiment to which the present disclosure is applied.

Referring to FIG. 1, an I2NSF system may include at least one of an I2NSF user, a network operator management system, a developer's management system, and/or at least one Network Security Function (NSF).

The I2NSF user communicates with the network operator management system via an I2NSF consumer-facing interface. The network operator management system communicates with an NSF(s) via an I2NSF NSF-facing interface. The developer's management system communicates with the network operator management system via an I2NSF registration interface. Hereafter, each component of an I2NSF system (I2NSF component) and each interface (I2NSF interface) are described.

(1) I2NSF User

An I2NSF user is an I2NSF component that requests information from another I2NSF component (e.g., a network operator management system) and/or uses a service (e.g., a network security service) provided by another I2NSF component (e.g., a developer's management system). For example, the I2NSF user may include an overlay network management system, an enterprise network manager system, another network domain manager, etc.

The object that performs the functions designated to the I2NSF user component may be referred to as an I2NSF consumer. As an example of the I2NSF consumer, a video-conference network manager that needs to dynamically give a notice to an underlay network to allow, rate-limit, or reject flow on the basis of a specific field of a packet for a time span, enterprise network administrators and management systems that needs to request a vendor network to enforce a specific I2NSF policy for specific flow, and an IoT management system that transmits a request to an underlay network to block flow coinciding with a set of a specific condition may be included.

The I2NSF user can create and distribute a high-level security policy. In detail, the I2NSF user needs to use a network security service to protect a network traffic from various malicious attacks. In order to request this security service, the I2NSF user can create a high-level security policy for a security service that it desires, and can inform the network operator management system of the high-level security polity.

In the process of preparing the high-level security polity, the I2NSF user has to consider the type of an NSF required to implement a security service or a security policy rule configuration for each NSF Further, the I2NSF user can be notified of a security event(s) in underlying an NSF(s) by the network operator management system. By analyzing the security event(s), the I2NSF user can recognize new attacks and can update (or create) a high-level security policy for dealing with the new attacks. As described above, the I2NSF user can define, manage, and monitor a security policy.

(2) Network Operator Management System

The network operator management system is a component that performs collection, distribution, and point for providing security, monitoring, and other actions. For example, the network operator management system may be a security controller. The network operator management system may be managed by a network security manager and may be referred to as an I2NSF management system.

One of the important functions of the network operator management system (or security controller) is to translate a high-level security policy (or policy rule) from the I2NSF user into a low-level security policy rule for a specific NSF(s). The network operator management system (or security controller) may receive a high-level security policy from the I2NSF user and determine the type of an NSF(s) required to enforce a policy requested first by the I2NSF user. Further, the network operator management system (security controller) may create a low-level security policy for each requested NSF(s). As a result, the network operator management system (or security controller) may set the created low-level security policy to each NSF(s).

Further, the network operator management system (or security controller) may monitor an NSF(s) that is being in driven in a system, and may maintain various items of information (e.g., network access information and a workload state) about each NSF(s). Further, the network operator management system (or security controller) may dynamically manage the pool of an NSF instance through dynamic life-cycle management of the NSF instance with the assistance of the developer's management system.

(3) NSF

The NSF is a logical entity or a software component that provides a security-related service. For example, the NSF may receive a low-level security policy, and may sense and block or attenuate a malicious network traffic on the basis of the low-level security policy. Accordingly, integrity and confidentiality of a network communication stream can be secured.

(4) Developer's Management System

The developer's management system is an I2NSF component that sends information to another I2NSF component (e.g., the I2NSF user or the network operator management system) and/or provide a service (e.g., a network security service). The developer's management system may be referred to as a vendor's management system. An object that performs a function designated to the developer's management system may be referred to as an I2NSF producer.

The developer's management system may be managed by a third-party security vendor that provides an NSF(s) to the network operator management system. Several developer's management systems of various security vendors may exist. For example, NSF-1, . . . , NSF-m may be defined as developer management system A, and NSF-1, . . . , NSF-n may be defined as developer management system B. However, the present disclosure is not limited thereto.

(5) I2NSF Consumer-Facing Interface (Briefly, Consumer-Facing Interface (CFI))

The CFI is an interface to an I2NSF system of a user, positioned between the I2NSF user and the network operator management system. By being designed in this way, only an abstract view of an NSF(s) is provided to a user with the details of an underlying NSF(s) hidden.

The CFI may be used to enable different users of an I2NSF system to define, manage, and monitor a security policy for specific flow in a management domain. A high-level security policy (policy rule) created by the I2NSF user may be transmitted to the network operator management system through the CFI (6) I2NSF NSF-Facing Interface (NFI)

The NFI is an interface positioned between the network operator management system (or security controller) and an NSF(s).

The NFI may be used to designate and monitor a flow-based security policy enforced by one or more NSFs. For example, the I2NSF system may use a flow-based NSF. In this case, the flow-based NSF is an NSF that examines network from in accordance with a set of policies to reinforce the security characteristic. Flow-based security by the flow-based NSF means that packets are examined in the received order and there is no correction for the packets in accordance with an examination process. The interface for the flow-based NSF may be classified as follows:

1) NSF Operational and Administrative Interface

This indicates an interface group used by the I2NSF management system to program the operation state of an NSF. The interface group also includes a management control capability. The I2NSF policy rule is one method of changing the interface group in a consistent manner. Since an application and an I2NSF component need to dynamically control the actions of traffics that they transmit and receive, most of I2NSF efforts are related to the interface group.

2) Monitoring Interface

This indicates an interface group used by the I2NSF management system to obtain monitoring information of one or more selected NSFs. Each interface of the interface group may be a query- or report-based interface. The difference between the two is that the query-based interface is used by the I2NSF management system to obtain information, but the report-based interface is used by an NSF to provide information.

The capability of the interface group may also be defined by another protocol such as SYSLOG and DOTS (Distributed Denial-of-Service Open Threat Signaling). The I2NSF management system may take one or more actions on the basis of reception of information. This should be designated by a policy rule. The interface group does not change the operation state of an NSF.

As described above, the NFI may be developed using a flow-based paradigm. The common trait of the flow-based NSF is to process a packet on the basis of the contents (e.g., header/payload) and/or context (e.g., a session state and an authentication state) of a received packet. This trait is one of requirements for defining the action of the I2NSF system.

The I2NSF system does not need to use all abilities of a given NSF and does not need to use all available NSFs. Accordingly, this abstraction enables an NSF feature to be handled in a building block by an NSF system. Therefore, a developer may freely use a security capability defined by an individual NSF for a vendor and a technology.

(7) I2NSF Registration Interface (RI)

The RI is an interface positioned between the network operator management system and the developer's management system. NSFs provided by different vendors may have different capabilities. Accordingly, in order to automate a process that uses various types of security capabilities provided by different vendors, the vendors need to have an exclusive interface for determining the capabilities of their NSFs. These exclusive interfaces may be referred to as I2NSF registration interface (RI).

The capability of an NSF may be configured in advance or may be dynamically searched through an I2NSF registration interface. If a new capability that is exposed to a consumer is added to an NSF, in order that interested management and control entity can know that a new capability needs to be registered on an I2NSF registry through the I2NSF registration interface.

Figure 2:
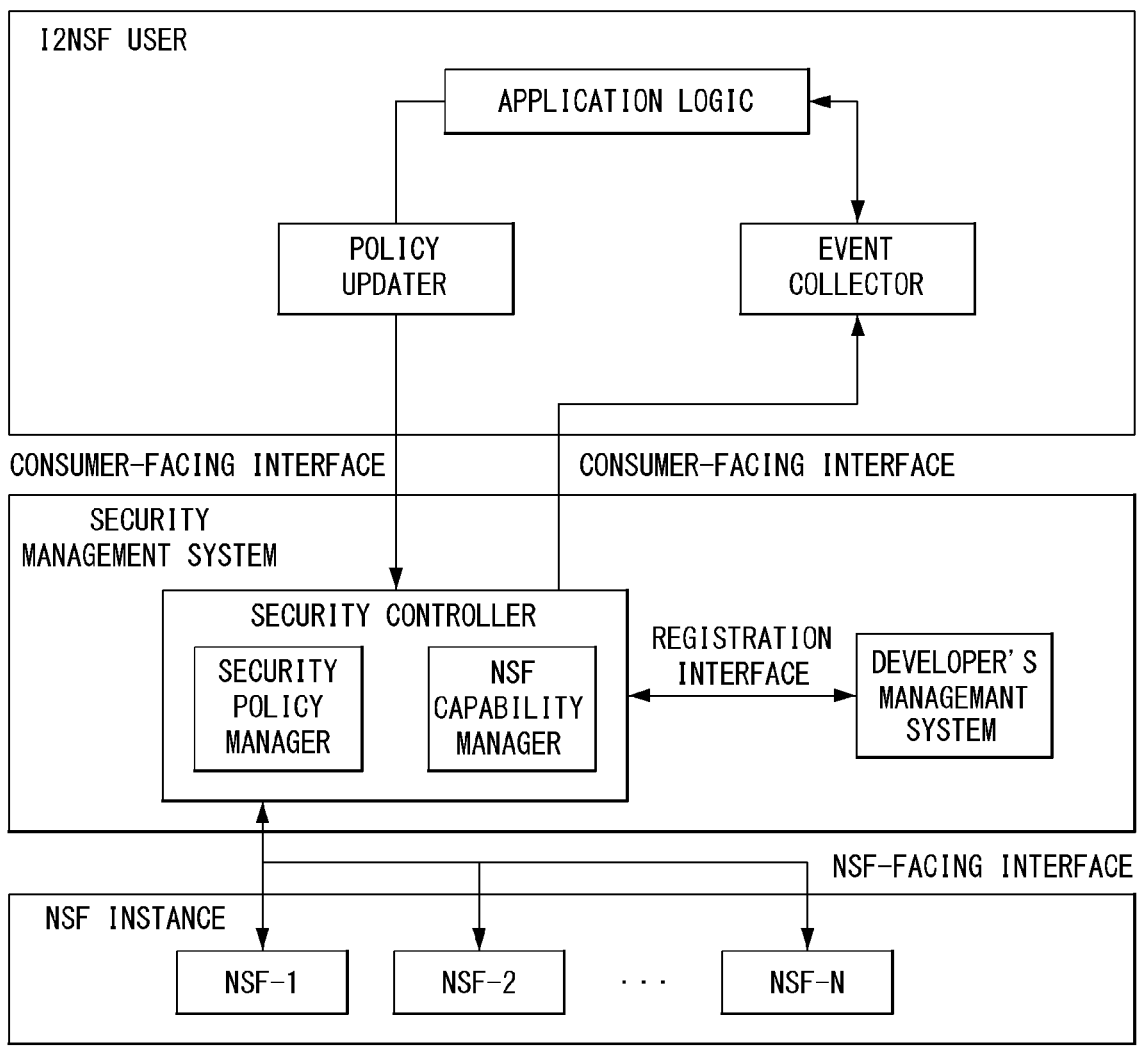
FIG. 2 illustrates an architecture of the I2NSF system, as an embodiment to which the present disclosure is applied.

FIG. 2 illustrates an architecture of the I2NSF system, as an embodiment to which the present disclosure is applied.

The I2NSF system of FIG. 2 shows in more detail the configuration of an I2NSF user and a network operator management system in comparison to the I2NSF system of FIG. 1. In FIG. 2, description overlapping the detailed description of FIG. 1 is omitted.

Referring to FIG. 2, an I2NSF system includes an I2NSF user, a security management system, and an NSF instance hierarchy. An I2NSF user hierarchy includes an application logic, a policy updater, and an event collector as components. A security management system hierarchy includes a security controller and a developer's management system. The security controller of the security management system hierarchy includes a security policy manager and an NSF capability manager as components.

The I2NSF user hierarchy communicates with the security management system hierarchy via a consumer-facing interface. For example, the policy updater and the event collector of the I2NSF user hierarchy communicates with the security controller of the security management system hierarchy via a consumer-facing interface. Further, the security management system hierarchy communicates with an NSF instance hierarchy via an NSF-facing interface. For example, the security controller of the security management system hierarchy communicates with an NSF instance(s) of the NSF instance hierarchy via the NSF-facing interface. Further, the developer's management system of the security management system hierarchy communicates with the security controller of the security management system hierarchy via a registration interface.

The I2NSF user hierarchy, the security controller component of the security management system hierarchy, the developer's management system component of the security management system hierarchy, and the NSF instance hierarchy of FIG. 2 respectively correspond to the I2NSF user hierarchy, the network operator management system component, the developer's management system component, and the NSF component of FIG. 1. Further, the consumer-facing interface, the NSF-facing interface, and the registration interface of FIG. 2 correspond to the consumer-facing interface, the NSF-facing interface, and the registration interface of FIG. 1. Hereafter, newly defined components included in each hierarchy are described.

(1) I2NSF User

As described above, an I2NSF user hierarchy includes the following three components: an application logic, a policy updater, and an event collector. The function and action of each component are as follows.

The application logic is a component that creates a high-level security policy. To this end, the application logic receives an event for updating (or creating) a high-level policy from the event collector and updates (or creates) the high-level policy on the basis of the collected event. Thereafter, the high-level policy is sent to the policy updater to be distributed to the security controller. In order to update (or create) the high-level policy, the event collector receives events transmitted by the security collector and transmits the events to the application logic. The application logic may update (or create) the high-level security policy based on this feedback process.

In FIG. 2, the application logic, the policy updater, and the event collector are shown as individual configurations, but the present disclosure is not limited thereto. In other words, each of them is a logic component and may be implemented as one or two components in the I2NSF system.

(2) Security Management System

As described above, the security controller of the security management system hierarchy includes two components such as a security policy manager and an NSF capability manager.

The security policy manager may receive a high-level policy from the policy updater through the CFI, and the high-level policy may be mapped to at least one low-level policy. The low-level policy is related to a given NSF capability registered in an NSF capability manager. Further, the security policy manager may transmit the policy to an NSF(s) through the NFI.

The NSF capability manager may designate the capability of an NSF registered by the developer's management system and share the capability with the security policy manager to create a low-level policy related to a given NSF capability. Every time a new NSF is registered, the NSF capability manager may request the developer's management system to register the capability of the NSF in a management table of the NSF capability manager through the registration interface. The developer's management system corresponds to another part of the security management system for registering the capability of a new NSF to the NSF capability manager.

In FIG. 2, the security policy manager and the NSF capability manager are shown as individual configurations, but the present disclosure is not limited thereto. In other words, each of them is a logic component and may be implemented as one component in the I2NSF system.

(3) NSF Instances

As shown in FIG. 2, the NSF instance hierarchy includes at least one NSF. In this case, all the NSFs are positioned in the NSF instance hierarchy. A high-level policy is mapped to a low-level policy and then the security policy manager transmits the policy to the NSF(s) through the NFI. In this case, the NSF may sense and block or attenuate a malicious network traffic on the basis of the received low-level security policy.

For quick development of a virtualization system, a high-class security capability is required in various scenarios. For example, it may require a network device of an enterprise network, a user equipment of a mobile network, a device of the internet, or a resident access device, etc.

NSFs produced by several security companies may provide various security capabilities to customers. That is, regardless of whether NSF are implemented by a physical or virtual capability, several NSF may provide a security service for a given network traffic by being combined with each other.

A security capability means a capability related to security of a series of networks that can be used for enforcing a security policy. The security capability is independent from an actually implemented security control mechanism and a set of capabilities that can be provided by NSFs is registered in all NSFs.

The security capability is a market leader providing a method that can define customized security protection by clearly explaining the security capability provided by a specific NSF. Further, the company supplying the security capability may be explained in a neutral manner through the security capability.

That is, it is not required to state a specific product and a feature may be considered for each capability when designing a network.

As described above, as the I2NSF interface that can be used for providing a security policy, two types may exist as follows.

First, an interface between an I2NSF user (or an application program) and a security controller (Consumer-Facing Interface) indicates service-directional interface providing NSF data and a communication channel between a service user and a network operator management system (or security controller).

The I2NSF Consumer-Facing Interface enables security information to be used for exchange between various applications (e.g., OpenStack or various BSS/OSS components) and a security controller. The design target of the I2NSF Consumer-Facing Interface is to implement and separate specs of a security service.

Secondly, an interface between NSF (e.g., a firewall, anti-invasion, and anti-virus) and a security controller (NSF-Facing interface) is used to separate a security management system from an NSF set and several implements and are independent in the manner in which an NSF is implemented (e.g., a virtual machine or actual appliances).

Hereafter, an object-directional information model about network security, contents security, and an attach attenuation capability is described with related I2NSF policy objects.

In the present disclosure, terms used in an information module may be defined as follows.

AAA: Access control, Authorization, Authentication
ACL: Access Control List
(D)DoS: (Distributed) Denial of Service (attack)
ECA: Event-Condition-Action
FMR: First Matching Rule (resolution strategy)
FW: Firewall
GNSF: Generic Network Security Function
HTTP: HyperText Transfer Protocol
I2NSF: Interface to Network Security Functions
IPS: Intrusion Prevention System
LMR: Last Matching Rule (resolution strategy)
MIME: Multipurpose Internet Mail Extensions
NAT: Network Address Translation
NSF: Network Security Function
RPC: Remote Procedure Call
SMA: String Matching Algorithm
URL: Uniform Resource Locator
VPN: Virtual Private Network (4) Information Model Design The start point of designing of a capability information model is to classify the types of security capabilities. For example, it is to classify the types of security types such as "IPS", "antivirus", and "VPN concentration apparatus".

Alternatively, a "packet filter" may be classified into a storage device that can allow for or reject packet transmission in accordance with various conditions (e.g., transmission and reception IP addresses, transmission and reception ports, and an IP protocol type field).

However, other devices such as a state-based firewall or an application program layer filter require more information. These devices filter a packet or communication, but are different in the state that categorizes and maintains packets and communications.

Analog consideration points may be considered in channel protection protocols. The channel protection protocols may protect a packet through a symmetric algorithm that can be negotiated into an asymmetric password, may operate in different layers, and may support different algorithms and protocols.

For safe protection, perfection, selective secrecy, anti-reply protection, and peer authentication should be applied to these protocols.

(5) Capability Information Model Overview

A capability information model defines a security capability model providing a base for automatic management of an NSF. The capability information module includes allowing a security controller to appropriately recognize and manage an NSF and appropriately declare such that an NSF can use capabilities in a correct way.

Some basic rules for security and a system that has to manage the basic rules are as follows.

Independence: Each security capability should be capability that has minimum overlap or dependence to another capability. Accordingly, the security capabilities can be freely used and combined. It is more important that a change to one capability does not influence another capability.

Abstraction: Each capability should be defined in a vendor-independent manner and should provide a standardized capability that is connected with a well-known interface and can describe and report a processing result. Accordingly, mutual operability with multiple vendors can be improved.

Automation: A system should be able to automatically search, automatically negotiate, and automatically update a security capability (i.e., without intervention of a user). This automation capability is particularly useful for managing several NSFs.

It is necessary to add a smart service (e.g., analysis, refinement, capability inference, and optimization) to a security system to which an embodiment of the present disclosure is applied. This capability is supported in main design patterns such as observer pattern, mediator pattern, and message exchange patterns.

Extendibility: A management system may require a scale up/down or scale in/out capability. Accordingly, due to this extendibility, it is possible to satisfy various performance requirements derived from a variable network traffic or service request. Further, a security capability that is influenced by extendibility may help to determine whether to call out a scaling only when supporting report statistics to a security controller.

Abstraction having a standard interface and a vender neutral capability set may be defined in accordance with the basic rules. This provides definition such that a capability model enabling a necessary NSF set to be used within a given time and security provided by a used NSF set is not ambiguous.

The security controller selects an NSF required to satisfy corresponding requirements by comparing requirements of a user and an application program with a currently available capability set.

Further, when an unknown threat (e.g., zero-day exploits and unknown malware) is reported by an NSF, a new capability may be created and/or the existing capability may be updated. For example, its signature and algorithm may be updated. As a result, the existing NSF is reinforced and/or a new NSF is created to cope with a new threat.

The new capability may be transmitted and stored in a central repository or may be individually stored in a local repository of a vendor. In both cases, a standard interface enables an update process to be easily performed.

(6) ECA Policy Model Overview

An "Event-Condition-Action (ECA)" policy model is used as a base for design of an I2NSF policy rule. In this case, terms related to the I2NSF policy may be defined as follows.

Event: An event occurs at an important point when a system that is managed is changed or in time in the environment of a system that is managed. An event may be used to determine whether it is possible to evaluate a condition clause of the I2NSF when being used in a context of the I2NSF policy rule. As an example of an I2NSF event, there may be a time and a user action (e.g., logon, logoff, and an action violating ACL).

Condition: A condition is defined as a set of a property, a capability, and/or a value to be compared with a set of a known property, feature, and/or value, and may execute or may not execute the (imperative) I2NSF policy rule. In an example of the I2NSF, coinciding property of a packet or flow and comparison of the internal state of an NSF with a desired state may be included.

Action: An action is used to control and monitor the side of a flow-based NSF when an event and a condition clause are satisfied. An NSF provides a security capability by executing various actions. In an example of an I2NSF work, intrusion detection and/or protection, web and flow filtering, and providing deep packet examination for a packet and flow may be included.

The I2NSF policy rule is composed of three Boolean clauses of an event clause, a condition clause, and an action clause.

The Boolean clause means a logical statement that is evaluated as TRUE or FALSE and may be composed of one or more terminologies.

When there are two or more terminologies, the Boolean clause connects the terminologies using logical connectives (i.e., AND, OR, and NOT). The logical connectives may have the meanings in the following Table 1.

Technically, a "policy rule" may actually function as a container aggregating not only metadata, but also the "event", "action" and "condition" described above.

The ECA policy model described above is very general, may be easily extended, and may avoid a latent limitation that may limit a generic security capability implementation.

Figure 3:
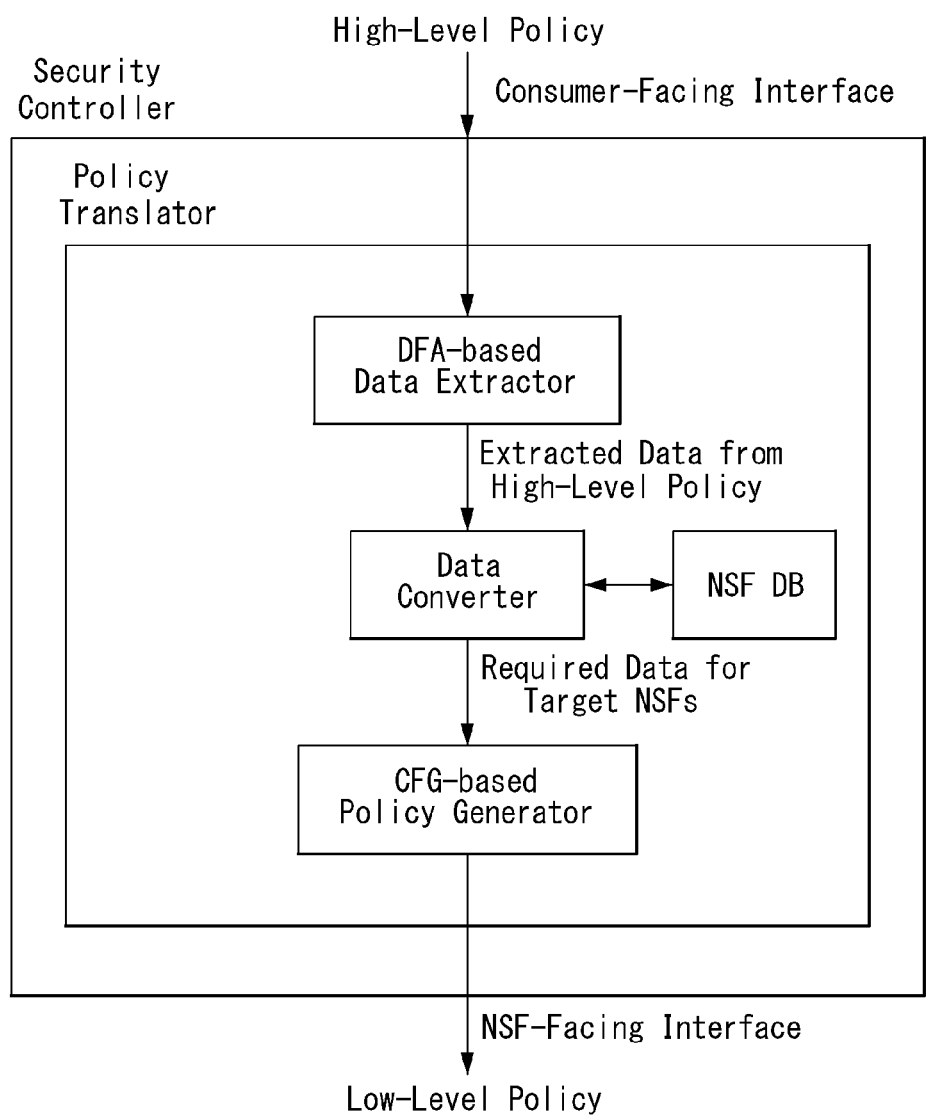
FIG. 3 illustrates a policy translator of a security controller system, as an embodiment to which the present disclosure is applied.

FIG. 3 illustrates a policy translator of a security controller system, as an embodiment to which the present disclosure is applied.

The present disclosure describes the mapping between a high-level security policy based on the Consumer-Facing Interface YANG data model and a low-level security policy based on the NSF-Facing Interface YANG data model. The present disclosure also describes an architecture of a security policy translator along with an NSF database, and a process of security policy translation with the NSF database.

A policy translator is included in a security controller of Network Security Functions (I2NSF) Framework, and translates a high-level policy into a low-level security policy for Network Security Function (NSF). An I2NSF user specifies the high-level policy in the I2NSF framework and delivers it to the security controller via the consumer-facing interface. This may be translated into the low-level policy by the policy translator of the security controller, delivered to a suitable NSF via the NSF-facing interface and the suitable NSF may execute a rule corresponding to the low-level policy.

(1) Necessity for Policy Translator

The security controller acts as coordinating capability between the I2NSF user and NSF. Also, the security controller includes capability information of NSFs that are registered via Registration Interface by developer's management system. The security controller needs to generate a low-level policy in the form of security rules intended by the high-level policy, which can be understood by the corresponding NSFs.

The translation from a high-level security policy to the corresponding low-level security policy will be able to rapidly perform I2NSF in real-world deployment. A rule in a high-level policy may include a broad target object, such as employees (low-level node) in a company for a security service (e.g., firewall and web filter). The employees may be included in human resource (HR) department, software engineering department, and advertisement department. Thus, a keyword of employee may be mapped to these employees from various departments. This mapping may be processed by the policy translator.

For example, the following two policies may be considered.

Block my low-level node (e.g., son) computers from malicious websites.

Drop packets from the IP address 10.0.0.1 and 10.0.0.3 to harm.com and illegal.com.

The above two policies are examples of policies for blocking malicious websites. Both policies are considered for the same purpose. However, NSF cannot understand the first policy, because the policies do not have any specified information for NSF. To set up the policy at an NSF, the NSF must receive at least the source IP address and website address for an operation. It means that the first sentence is NOT compatible for an NSF policy.

Conversely, when I2NSF users request a security policy to the system, they never make a security policy like the second example. For generating a security policy like the second example, the user must know that the NSF needs to receive the specified information, source IP address and website address. It means that the user understands the NSF professionally, but there are not many professional users in a small size of company or at a residential area. In conclusion, the I2NSF user prefers to issue a security policy in the first example, but an NSF will require the same policy as the second example with specific information. Therefore, an advanced translation scheme of security policy is REQUIRED in I2NSF.

The present disclosure proposes an approach using Automata theory for the policy translation, such as Deterministic Finite Automaton (DFA) and Context Free Grammar (CFG). The Automata theory is based on the foundation of programming language and compiler. Thus, with this approach, the I2NSF user can easily specify a high-level security policy that will be enforced into the corresponding NSFs with a compatibly low-level security policy with the help of the policy translator. The present disclosure also proposes a modularized translator structure for easy management.

(2) Design of Policy Translator

Commonly used security policies are created as Extensible Markup Language (XML) files. A popular way to change the format of an XML file is to use an Extensible Stylesheet Language Transformation (XSLT) document. XSLT is an XML-based language to transform an input XML file into another output XML file. However, the use of XSLT makes it difficult to manage the policy translator and to handle the registration of new capabilities of NSFs. With the necessity for a policy translator, the present disclosure describes a policy translator based on Automata theory.

(3) Overall Structure of Policy Translator

The policy translator may include a data extractor, a data converter, and a policy generator as three main components.

The data extractor is a DFA-based module for extracting data from a high-level policy that the I2NSF user provides via consumer-facing interface.

The data converter may convert the extracted data into the capabilities of target NSFs for a low-level policy. It refers to an NSF database (DB) for converting an abstract subject or object into the corresponding concrete subject or object (e.g., IP address and website URL).

The policy generator may generate a low-level policy which will execute the NSF capabilities through the generator.

Figure 4:
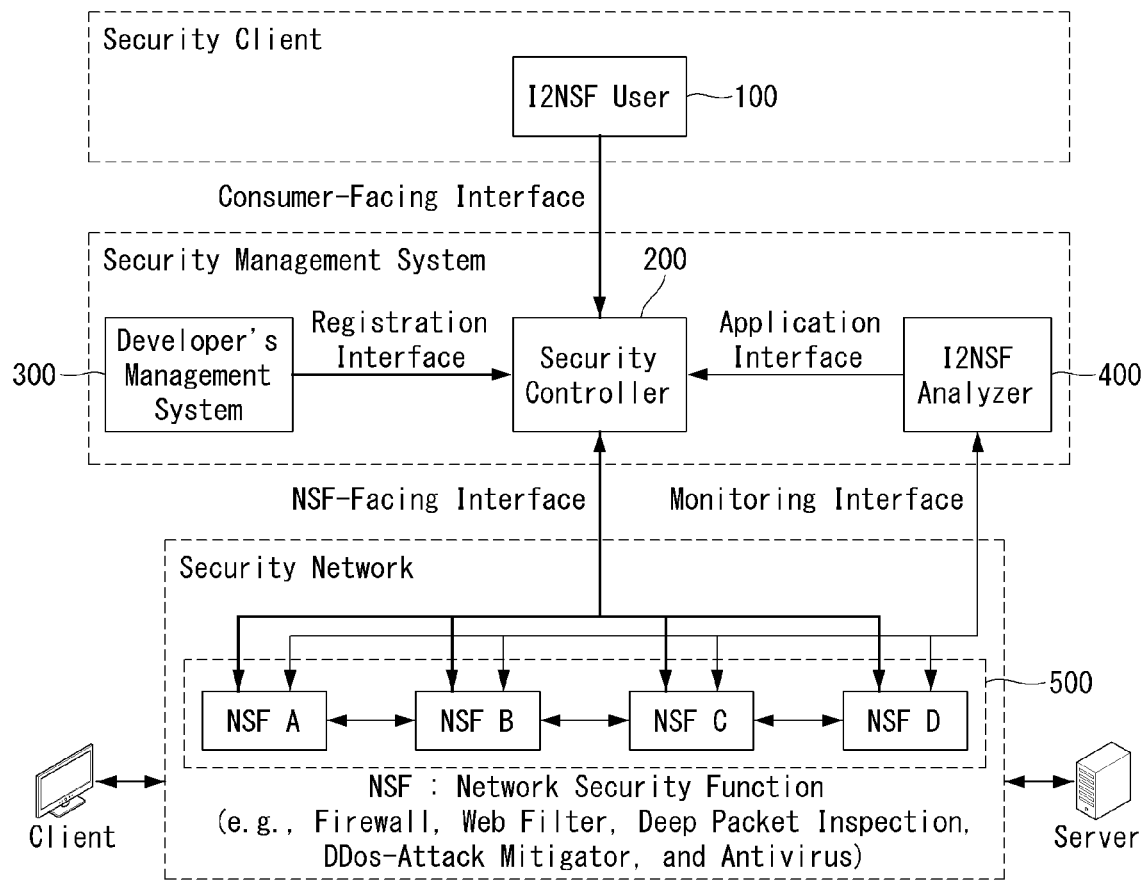
FIG. 4 illustrates an I2NSF system for security management automation, as an embodiment to which the present disclosure is applied.

FIG. 4 illustrates an I2NSF system for security management automation, as an embodiment to which the present disclosure is applied.

An I2NSF system for security management automation to which the present disclosure is applied may roughly include a security customer layer, a security management system layer, and a security network layer.

Specifically, the I2NSF system for security management automation may include an I2NSF user 100, a security controller 200, a developer's management system 300, an I2NSF analyzer 400, and/or a network security function (NSF) 500.

The security customer layer may include at least one I2NSF user 100.

The I2NSF user 100 generates a network security management policy (or intent) from a user perspective and manages network security. The network security management policy (or intent) generated by the I2NSF user 100 is a high-level policy and includes content for network security management.

The security management system layer may include at least one of the security controller 200, the developer's management system 300, and the I2NSF analyzer 400.

The security controller 200 translates a security policy (or intent) of the I2NSF user 100 into a low-level policy applicable to the network. Here, translation may mean transform, change, substitution, modification, or mapping, etc. and may be appropriately applied in the corresponding sentence.

The developer's management system 300 may provide an image of a virtual machine corresponding to the security service.

The I2NSF analyzer 400 may deliver, to the security controller 200, a high-level policy responding to a new security attack through monitoring data analysis.

The security network layer may include at least one NSF 500. The security network layer may be connected to a customer terminal and a server.

The NSF may provide suitable network service functions according to the security policy (or intent) of the I2NSF user 100.

The I2NSF system for security management automation illustrated in FIG. 4 may connect components based on at least one of the following interfaces. For example, the I2NSF system for security management automation may include at least one of a consumer-facing interface, an NSF-facing interface, a registration interface, a monitoring interface, and/or an application interface. Here, the consumer-facing interface may be called a consumer policy delivery interface, and the NSF-facing interface may be called an NSF policy delivery interface.

The consumer-facing interface connects the I2NSF user 100 to the security controller 200 and delivers, to the security controller 200, an intent that is the high-level security policy from the I2NSF user 100.

The NSF-facing interface connects the security controller 200 to the NSFs included in the security network layer. The NSF-facing interface delivers, to the appropriate NSF, a configuration intent that is the low-level security policy translated by the security controller 200.

The registration interface connects the developer's management system 300 to the security controller 200. Capability for various NSFs for the network security management of the I2NSF user 100 is registered with the security controller 200 via the registration interface, and is used to generate NSFs for security service required in the future.

The monitoring interface connects the NSF to the I2NSF analyzer 400. The monitoring interface delivers, to the I2NSF analyzer 400, an event and NSF activity data for monitoring whether the intent (or security policy) has been applied to the NSF without problems as intended by the I2NSF user 100, whether the NSF has found a security attack, whether the NSF is being misused as an internal security attacker, or whether an unexpected event has occurred in the NSF or the network switch.

The application interface connects the I2NSF analyzer 400 to the security controller 200. The application interface delivers, to the security controller 200, a security policy capable of solving a wrong intent (or security policy) due to a mistake of the I2NSF user 100, an external network security attack, an internal network security attack, and an unexpected network event.

An embodiment of the present disclosure describes a method of providing security management automation through five components and five interfaces of the I2NSF framework. An embodiment of the present disclosure also describes a blockchain-based audit system for response to network integrity, non-repudiation, and supply-chain attack. Accordingly, an embodiment of the present disclosure describes the framework that extends I2NSF framework standard to manage and monitor network security in real time, and a security service system that enables blockchain-based grasp and investigation in the event of an error.

An embodiment of the present disclosure describes an automatic mapping of security policy variables through mapping of a module of YANG data model of a consumer policy delivery interface for a high-level security policy and a module of YANG data model of an NSF policy delivery interface for a low-level security policy in order to automate a translation process of a security policy translator.

An embodiment of the present disclosure provides an extension of the framework of Interface to Network Security Functions (I2NSF) for security management automation (SMA) in cloud-based security services, and the Security Management Automation may include a security polity translation and a feedback-based security service enforcement. For reliable management for network security services, an embodiment of the present disclosure can apply a network management and verification facility using a decentralized audit system (e.g., blockchain, etc.). The decentralized audit system can facilitate the non-repudiation of configuration commands and monitoring data generated in the I2NSF framework.

The terminologies necessary to describe this are defined as follows.

Security Management Automation (SMA)

SMA indicates security management automation and means that a high-level security policy from a user (or administrator) is well-enforced in a target I2NSF system. The high-level security policy may be translated into the corresponding low-level security policy by a security policy translator and dispatched to appropriate NSFs.

The SMA may monitor and analyze the activity and performance of the NSFs through the monitoring of the NSFs. The SMA may augment the security rules of the low-level security policy or generate new security rules to configure them to appropriate NSFs, if needed.

Security Policy Translation (SPT)

Security Policy Translation (SPT) means that a high-level security policy can be translated into a low-level security policy, and the low-level security policy is configured by an NSF for a specific security service. For example, the specific security service may include firewall, web filter, deep packet inspection, DDos-attack mitigation, and anti-virus.

Feedback-Based Security Management (FSM)

Feedback-based Security Management (FSM) means that a security service can be evolved or updated by updating a security policy (having security rules) and adding new security rules for detected security attacks by processing and analyzing the monitoring data of NSFs.

Embodiment (1): I2NSF Framework for Security Management Automation

In I2NSF framework for security management automation to which the present disclosure is applied, an I2NSF user 100 can use security functions by delivering high-level security policies, which specify security requirements that the I2NSF user 100 wants to enforce, to a security controller 200 via the Consumer-Facing Interface (CFI).

The I2NSF system for security management automation may include the I2NSF user 100, the security controller 200, a developer's management system 300, an I2NSF analyzer 400, and/or a network security function (NSF) 500.

The I2NSF user 100 may deliver the high-level security policies to the security controller 200. Alternatively, the content described above may be applied.

The security controller 200 may control and manage other system components in the I2NSF framework. For example, the security controller 200 may translate the high-level security policy into the corresponding low-level security policy and select appropriate NSFs to execute the security rules of the low-level security policies.

The developer's management system 300 may provide an image of a virtualized NSF for a security service to the I2NSF framework, and register the capability and access information of an NSF with the security controller 200.

The NSF provides a virtual network function (VNF) for a specific network security service such as firewall, web filter, deep packet inspection, DDoS-attack mitigation, and anti-virus.

The I2NSF analyzer 400 may collect monitoring data from NSFs and analyze the data for checking the activity and performance of the NSFs using machine learning techniques (e.g., deep learning). If there is a suspicious attack activity for the target network or NSF, the I2NSF analyzer 400 may deliver a report of the augmentation or generation of security rules to the security controller 200.

For SMA-based security services with feedback-based security management (FSM), the I2NSF analyzer 400 as a new I2NSF component may be required for the legacy I2NSF framework to collect monitoring data of NSFs and analyze them.

Embodiment (2): Interface with SMA-Based I2NSF Framework

An I2NSF system for security management automation to which the present disclosure is applied may connect components based on at least one of the following interfaces. For example, the I2NSF system for security management automation may include at least one of a consumer-facing interface, an NSF-facing interface, a registration interface, a monitoring interface, and/or an application interface. Here, the consumer-facing interface may be called a consumer policy delivery interface, and the NSF-facing interface may be called an NSF policy delivery interface.

The consumer-facing interface connects the I2NSF user 100 to the security controller 200 and delivers the high-level security policy from the I2NSF user 100 to the security controller 200.

The NSF-facing interface connects the security controller 200 to the NSFs. The NSF-facing interface delivers the low-level security policy to the corresponding NSF.

The registration interface connects the developer's management system 300 to the security controller 200. The registration interface may be used to register capability and access information of the NSF with the security controller 200 or to process a query of the NSF required for the low-level security policy.

The monitoring interface connects the NSF to the I2NSF analyzer 400. The monitoring interface may collect monitoring data from an NSF and check the activity and performance of an NSF for a possible malicious traffic.

The application interface connects the I2NSF analyzer 400 to the security controller 200. The application interface delivers a report of NSF status and the augmentation or generation of security rules to the security controller 200, and allows the security controller 200 to apply it to its security policy management.

Figure 5:
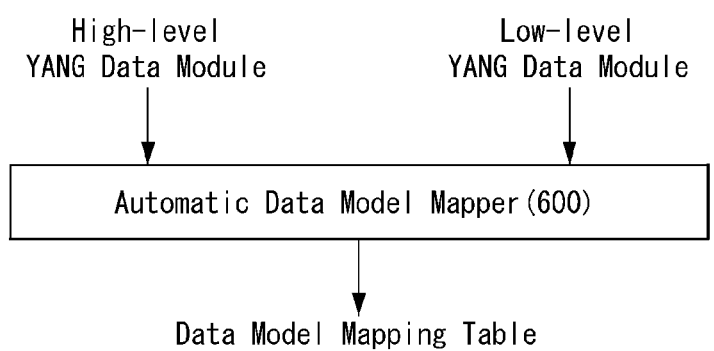
FIG. 5 illustrates a block diagram of an automatic data model mapper performing automation mapping of a high-level data model and a low-level data model, as an embodiment to which the present disclosure is applied.

FIG. 5 illustrates a block diagram of an automatic data model mapper 600 performing automation mapping of a high-level data model and a low-level data model, as an embodiment to which the present disclosure is applied.

Embodiment (3): Inter-Interface Automatic Policy Mapping

To facilitate security policy translation (SPT), the security controller 200 may include a security policy translator that performs the translation of a high-level security policy into the corresponding low-level security policy. For automatic SPT services, the I2NSF framework may connect a high-level YANG data model and a low-level YANG data model in an automatic manner.

The high-level YANG data model may be used for the I2NSF consumer-facing interface, and the low-level YANG data model may be used for the I2NSF NSF-facing interface.

FIG. 5 illustrates an automatic mapping process between a high-level data model and a low-level data model through the automatic data model mapper 600.

The automatic data model mapper 600 may use the high-level YANG data model for the consumer-facing interface and the low-level YANG data model for the NSF-facing interface. The automatic data model mapper 600 may construct a mapping table that associates data attributes (or variables) of a high-level YANG data module with the corresponding data attributes (or variables) of a low-level YANG data module. The automatic data model mapper 600 may also generate a set of production rules of the context free grammar for the construction of an XML file of low-level security policy rules.

Figure 6:
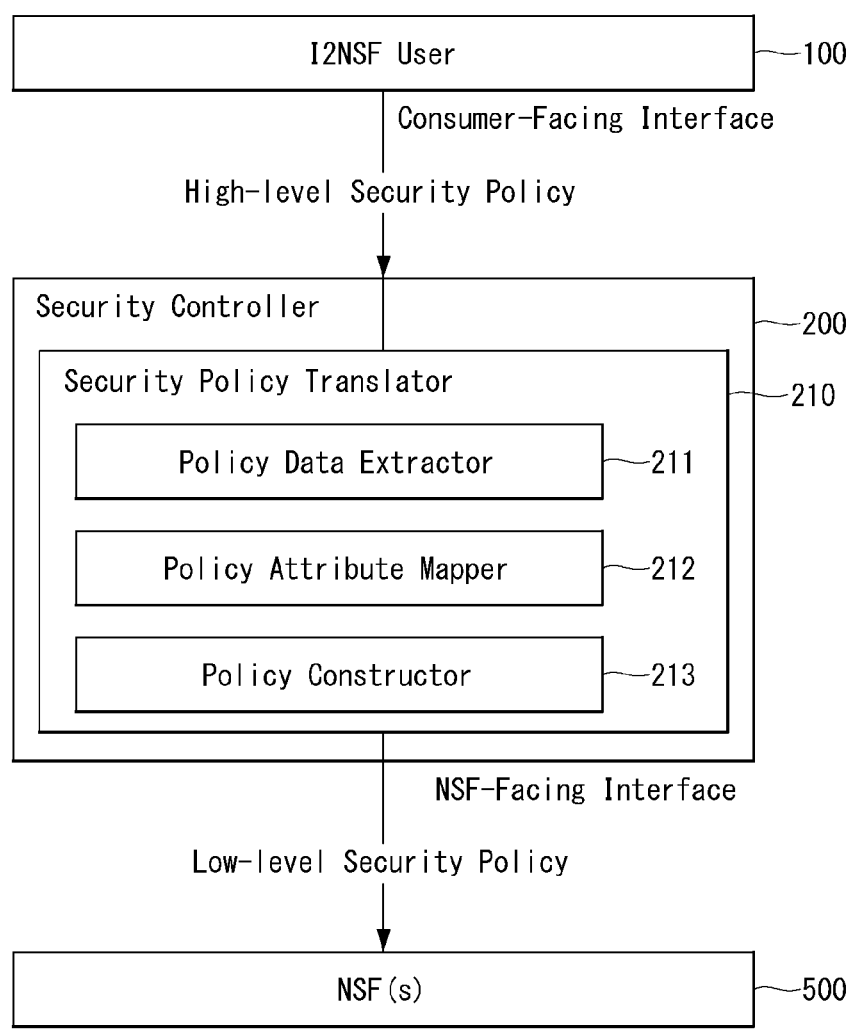
FIG. 6 illustrates a block diagram of a security policy translator translating a high-level security policy into a low-level security policy, as an embodiment to which the present disclosure is applied.

FIG. 6 illustrates a block diagram of a security policy translator translating a high-level security policy into a low-level security policy, as an embodiment to which the present disclosure is applied.

The I2NSF system for security management automation to which the present disclosure is applied may roughly include the I2NSF user 100, the security controller 200, and the NSF 500. The I2NSF system may include all the components illustrated in FIG. 4, but the present disclosure is described focusing on the security controller 200 including a security policy translator 210 with reference to FIG. 6.

The security policy translator 210 may include at least one of a policy data extractor 211, a policy attribute mapper 212, and a policy constructor 213.

The policy data extractor 211 may extract attribute information related to a security policy from a high-level security policy that is delivered from the I2NSF user 100 to the security controller 200.

The policy attribute mapper 212 may map attribute information and attribute values of the high-level security policy to the corresponding attribute information and attribute values of the low-level security policy.

The policy constructor 213 may construct the low-level security policy that is delivered from the security controller 200 to the corresponding NSF Embodiment (4): Security System Audit There is a drawback in that the I2NSF framework is weak to both an inside attack and a supply chain attack since the I2NSF framework trusts in NSFs provided by the developer's management system 300 and assumes that NSFs appropriately work for their security services.

Accordingly, in order to detect the malicious activity of either an insider attacker using the developer's management system 300 or a supply chain attacker using the compromised developer's management system 300, an audit system is required for the I2NSF framework.

For this audit service, the I2NSF system for security management automation to which the present disclosure is applied may use a decentralized audit system (e.g., blockchain, etc.). The decentralized audit system can facilitate the non-repudiation of configuration commands and monitoring data generated in the I2NSF system.

To support the audit service in the I2NSF system for security management automation, all the components in the I2NSF system may report their activities (e.g., configuration commands and monitoring data) to the audit system as transactions.

Figure 7:
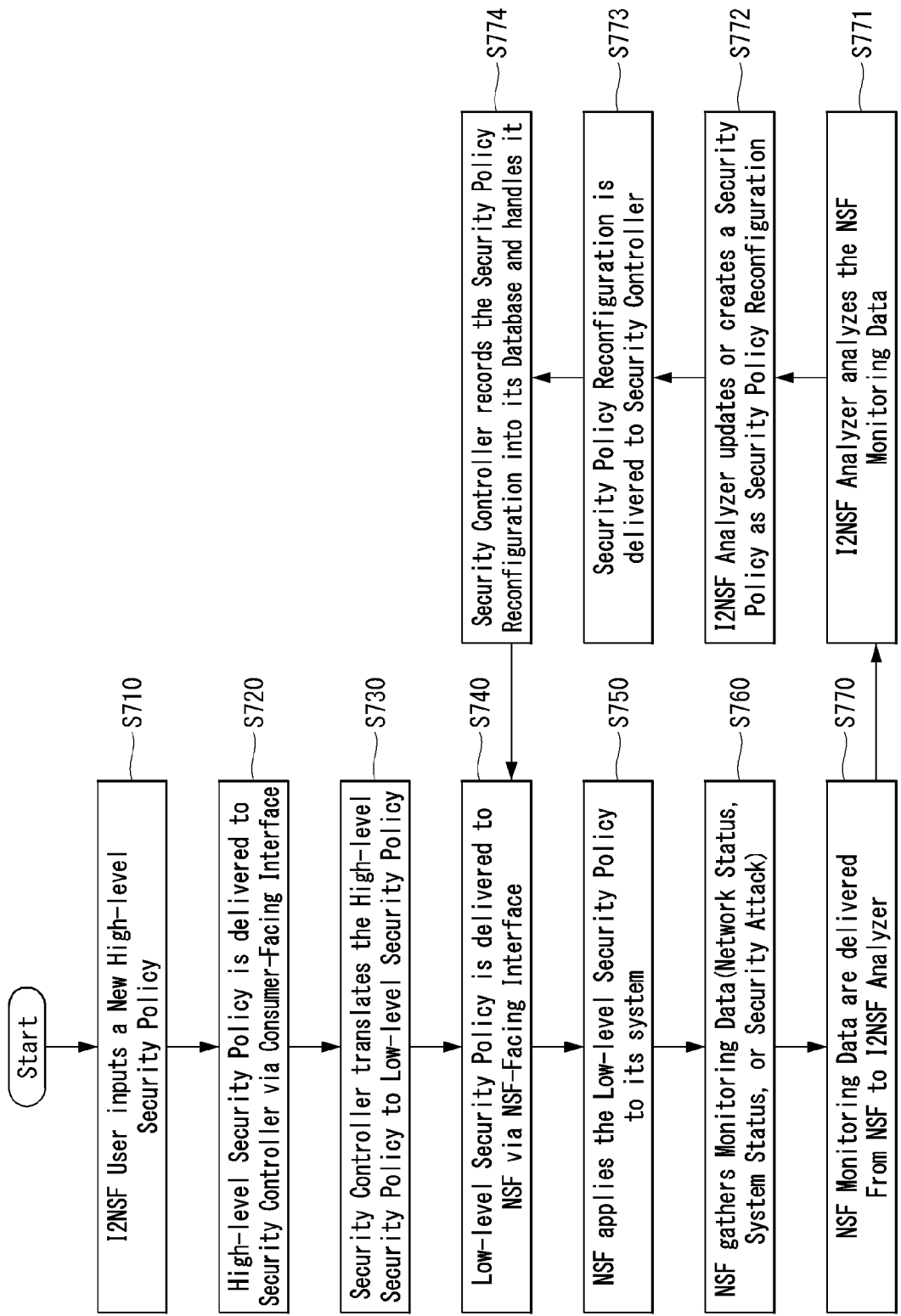
FIG. 7 is a flow chart performing security management automation, as an embodiment to which the present disclosure is applied.

FIG. 7 is a flow chart performing security management automation, as an embodiment to which the present disclosure is applied.

First, an I2NSF user may input a new high-level security policy, in S710.

The high-level security policy may be delivered to a security controller via a consumer-facing interface, in S720.

The security controller may translate the high-level security policy into a low-level security policy, in S730.

The low-level security policy may be delivered to an NSF via an NSF-facing interface, in S740.

The NSF may apply the low-level security policy to its system, in S750.

The NSF may collect monitoring data, in S760. For example, the monitoring data may include at least one of network status information, system status information, or security attack information.

The monitoring data may be delivered from the NSF to an I2NSF analyzer, in S770.

The I2NSF analyzer may analyze the monitoring data, in S771.

The I2NSF analyzer may update or create a security policy for security policy reconfiguration, in S772.

The reconfigured security policy may be delivered to the security controller, in S773.

The security controller may record and use the reconfigured security policy in its database, in S774.

Afterwards, a security management automation process may return again to the step S740 and repeatedly perform the steps S740 to S774.

Figure 8:
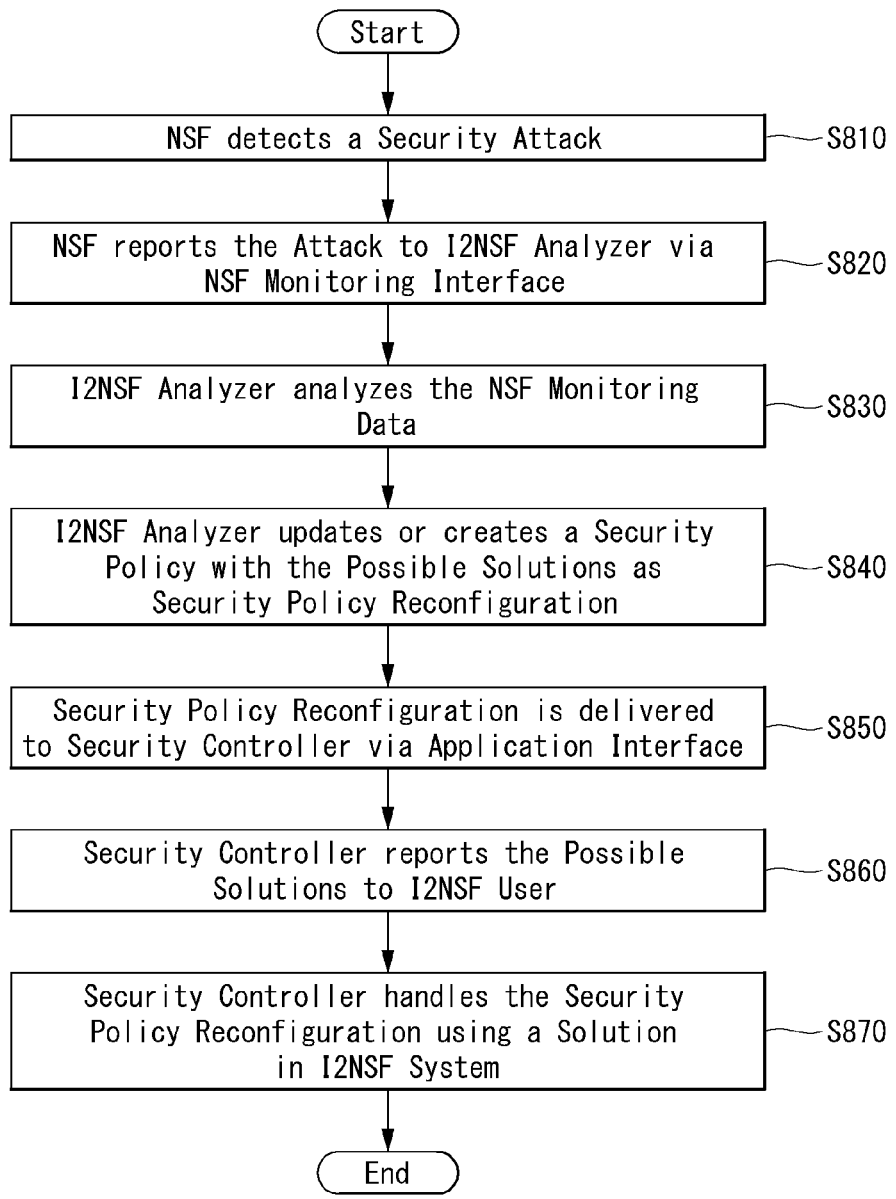
FIG. 8 is a flow chart reconfiguring a security policy, as an embodiment to which the present disclosure is applied.

FIG. 8 is a flow chart reconfiguring a security policy, as an embodiment to which the present disclosure is applied.

The NSF may detect a security attack, in S810.

The NSF may report the security attack to the I2NSF analyzer via a monitoring interface. That is, the NSF may transmit security attack information to the I2NSF analyzer, in S820.

The I2NSF analyzer may analyze monitoring data, in S830.

The I2NSF analyzer may update or create a security policy with possible solutions for security policy reconfiguration, in S840.

The reconfigured security policy may be delivered to the security controller via an application interface, in S850.

The security controller may record the possible solutions or a new security policy to the I2NSF user, in S860. That is, the security controller may transmit solution information and/or the new security policy to the I2NSF user.

The security controller may use the reconfigured security policy based on the solution information or the new security policy in the I2NSF system for security management automation, in S870.

Figure 9:
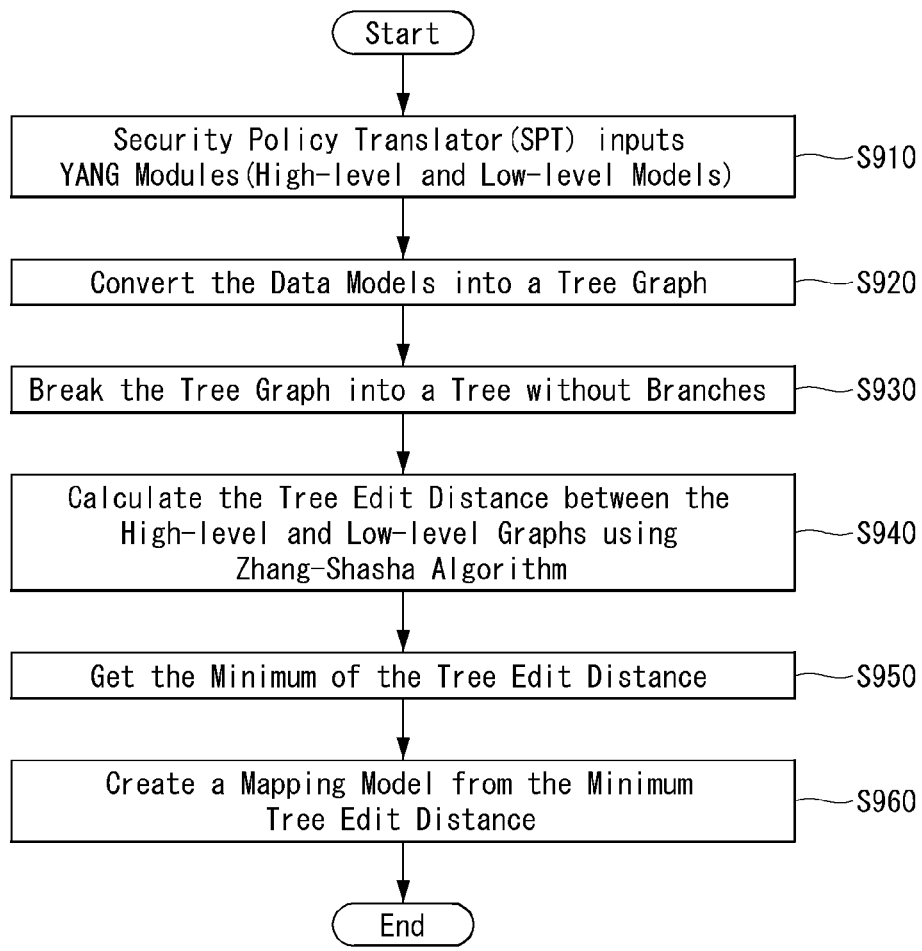
FIG. 9 is a flow chart illustrating a process of generating feedback information for system malfunction and transmitting it to a security controller, as an embodiment to which the present disclosure is applied.
Figure 10:
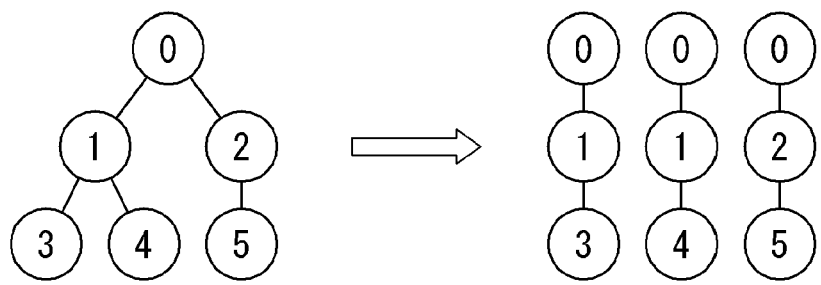
FIG. 10 illustrates a process of converting a tree graph into a non-branch tree, as an embodiment to which the present disclosure is applied.

FIG. 9 is a flow chart illustrating a process of generating feedback information for system malfunction and transmitting it to a security controller, as an embodiment to which the present disclosure is applied. FIG. 10 illustrates a process of converting a tree graph into a non-branch tree, as an embodiment to which the present disclosure is applied.

A security policy translator may input YANG modules (a high-level model and a low-level model), in S910.

The security policy translator may convert data models into a tree graph, in S920.

The security policy translator may convert the tree graph into a non-branch tree, in S930. As illustrated in FIG. 10, the non-branch tree can be seen.

The security policy translator may calculate a tree edit distance between a high-level graph and a low-level graph based on Zhang-Shasha algorithm, in S940.

The security policy translator may obtain a minimum value of the tree edit distance, in S950.

The security policy translator may generate an automatic mapping model based on the minimum value of the tree edit distance, in S960.

Figure 11:
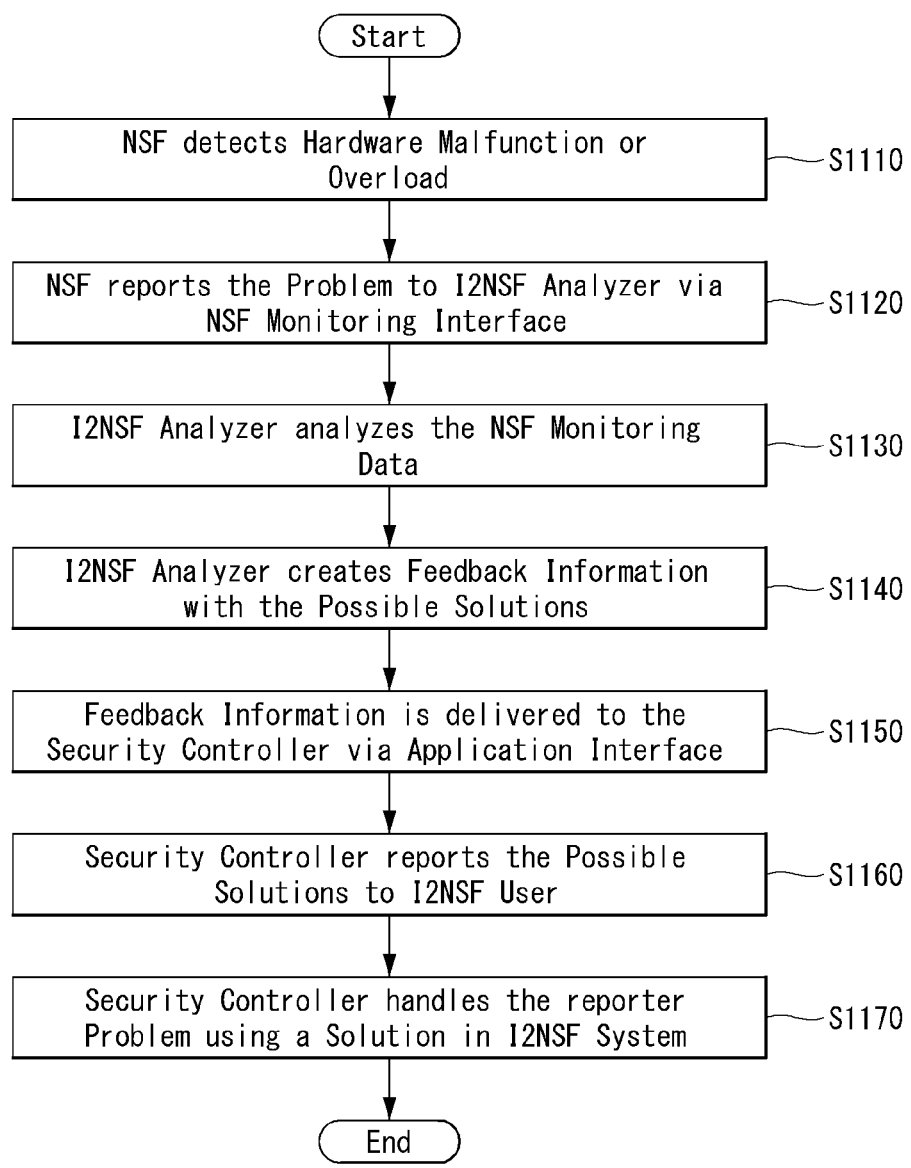
FIG. 11 is a flow chart illustrating a process of mapping attributes of a high-level security policy to attributes of a low-level security policy, as an embodiment to which the present disclosure is applied.

FIG. 11 is a flow chart illustrating a process of mapping attributes of a high-level security policy to attributes of a low-level security policy, as an embodiment to which the present disclosure is applied.

Specifically, the FIG. 11 explains a process of delivering monitoring data to the I2NSF analyzer via the monitoring interface by the NSF, discovering a problem of the NSF based on analysis of the monitoring data and delivering possible solution information to the security controller via the application interface by the I2NSF analyzer, and processing the problem by the security controller.

The NSF may detect hardware malfunction or overload, in S1110.

The NSF may report a problem to the I2NSF analyzer via the monitoring interface, in S1120. That is, the NSF may transmit problem information to the I2NSF analyzer.

The I2NSF analyzer may analyze monitoring data containing the problem information, in S1130.

The I2NSF analyzer may generate feedback information based on a possible solution, in S1140.

The feedback information may be delivered to the security controller via the application interface, in S1150.

The security controller may report the possible solution to the I2NSF user, in S1160. That is, the security controller may transmit solution information to the I2NSF user.

The security controller may handle a problem based on the solution information in the I2NSF system, in S1170.

Figure 12:
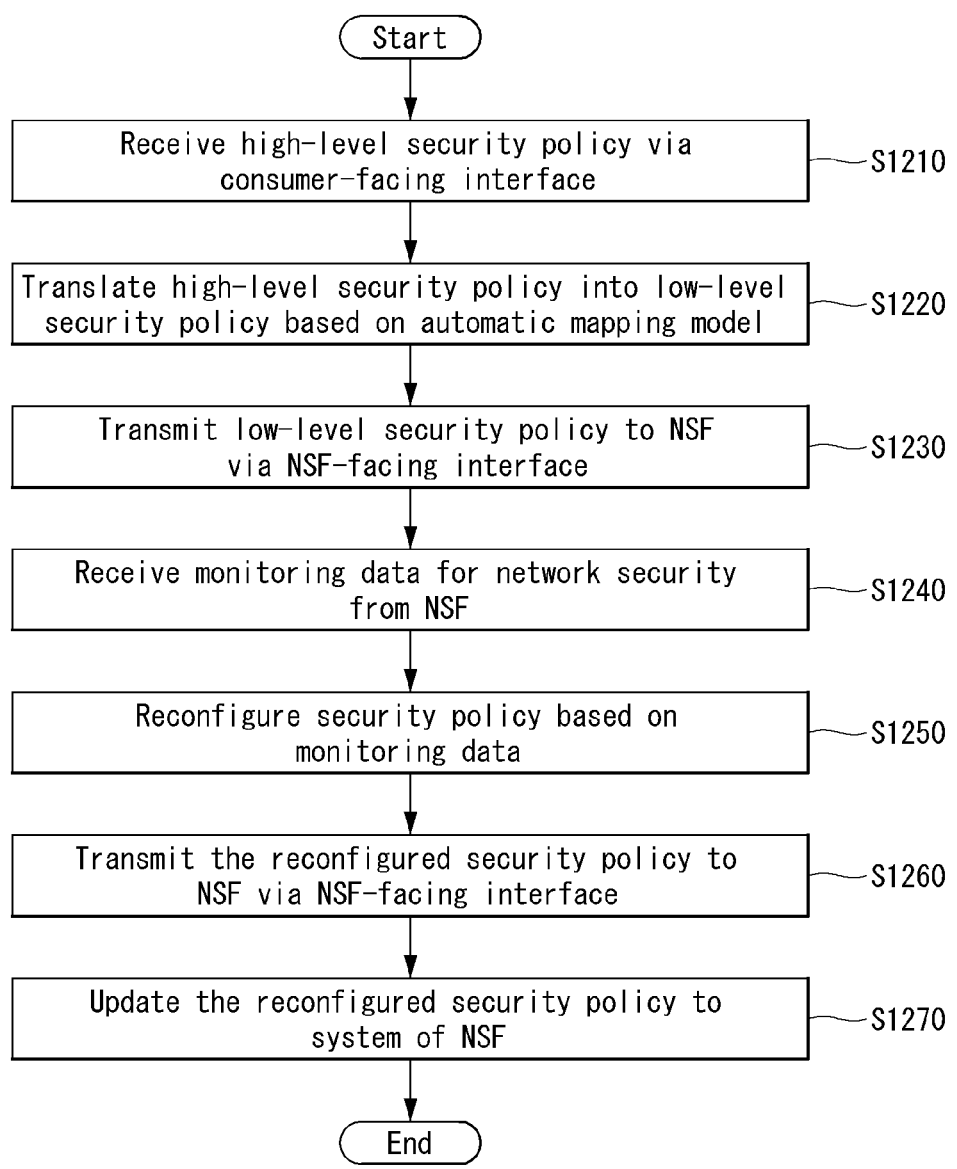
FIG. 12 is a flow chart illustrating a method of performing security management automation in an Interface to Network Security Functions (I2NSF) system, as an embodiment to which the present disclosure is applied.

FIG. 12 is a flow chart illustrating a method of performing security management automation in an Interface to Network Security Functions (I2NSF) system, as an embodiment to which the present disclosure is applied.

The I2NSF system may receive a high-level security policy via a consumer-facing interface, in S1210.

The I2NSF system may translate the high-level security policy into a low-level security policy based on an automatic mapping model, in S1220.

The I2NSF system may transmit the low-level security policy to an NSF via an NSF-facing interface, in S1230. Here, the low-level security policy may be applied to a system of the NSF.

The I2NSF system may receive monitoring data for a network security from the NSF, in S1240.

The I2NSF system may reconfigure a security policy based on the monitoring data, in S1250. For example, the I2NSF system may update an existing security policy or create a new security policy.

The I2NSF system may transmit the reconfigured security policy to the NSF via the NSF-facing interface, in S1260. Here, the reconfigured security policy may be updated to a system of the NSF, in S1270.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

Although exemplary aspects of the present disclosure have been described for illustrative purposes, those skilled in the art will appreciate that various modifications, additions and substitutions are possible, without departing from essential characteristics of the disclosure.

What is claimed is:

1. A method of performing a security management automation in an Interface to Network Security Functions (I2NSF) system, the method comprising:

receiving, by a security controller of a security management system, a high-level security policy from an I2NSF user via a consumer-facing interface;

translating the high-level security policy into a low-level security policy, in a form of a security rule, based on an automatic mapping model;

transmitting the low-level security policy to a network security function (NSF) via an NSF-facing interface, the low-level security policy being applied to a system of the NSF;

receiving, by an I2NSF analyzer in the security management system, monitoring data representing a new security attack on a network security from the NSF, and transmitting a high-level policy responding to the new security attack to the security controller based on the received monitoring data;

reconfiguring the low-level security policy from the transmitted high-level policy based on the received monitoring data to obtain a reconfigured security policy; and transmitting the reconfigured security policy to the NSF via the NSF-facing interface, wherein the reconfigured security policy is updated to the system of the NSF, wherein the translating comprises:

extracting attribute information related to the security policy from the high-level security policy;

mapping the attribute information of the high-level security policy to the corresponding attribute information of the low-level security policy; and creating the low-level security policy based on a result of mapping, wherein the mapping comprises constructing a mapping table that associates data attributes or variables of a high-level Yet Another Next Generation (YANG) data module with the corresponding data attributes or variables of a low-level YANG data module, and wherein a set of production rules for a context-free grammar for construction of rules of the low-level security policy is generated based on the mapping table, and wherein the mapping further comprises:
- converting a high-level YANG data model and a low-level YANG data model into each tree graph;
- converting the tree graph into a non-branch tree;
- calculating a tree edit distance between a high-level graph and a low-level graph based on Zhang-Shasha algorithm;
- obtaining a minimum value of the tree edit distance; and
- creating the automatic mapping model from the tree edit distance.

2. The method of claim 1, wherein the low-level security policy includes a specific security service, and wherein the specific security service includes at least one of a firewall, a web filter, a deep packet inspection, a DDoS-attack mitigation, and an anti-virus.

3. The method of claim 1, wherein the I2NSF system applies a network management or verification facility by a decentralized audit system, and wherein a blockchain technology is applied to the decentralized audit system.

4. An Interface to Network Security Functions (I2NSF) system configured to perform a security management automation, the I2NSF system comprising:

a security management system including a hardware security controller configured to receive a high-level security policy from an I2NSF user and translate the high-level security policy into a low-level security policy, in a form of a security rule; and an I2NSF analyzer disposed in the security management system, and configured to:

receive monitoring data representing a new security attack on a network security from at least one network security function (NSF) component;

transmit a high-level policy responding to the new security attack to the hardware security controller based on the received monitoring data; and reconfigure the low-level security policy from the transmitted high-level policy based on the received monitoring data to obtain a reconfigured security policy, wherein the hardware security controller is further configured to transmit the reconfigured security policy to at least one NSF component, wherein at least one NSF component is configured to:
apply the reconfigured security policy to an NSF system;
extract attribute information related to the security policy from the high-level security policy;
map the attribute information of the high-level security policy to the corresponding attribute information of the low-level security policy;
create the low-level security policy based on a result of mapping;
and construct a mapping table that associates data attributes or variables of a high-level Yet Another Next Generation (YANG) data module with the corresponding data attributes or variables of a low-level YANG data module, wherein a set of production rules for a context-free grammar for construction of rules of the low-level security policy is generated based on the mapping table, and wherein the hardware security controller is further configured to:
convert a high-level YANG data model and a low-level YANG data model into each tree graph:
convert the tree graph into a non-branch tree:
calculate a tree edit distance between a high-level graph and a low-level graph based on Zhang-Shasha algorithm:
obtain a minimum value of the tree edit distance;
and create an automatic mapping model from the tree edit distance.

5. The I2NSF system of claim 4, wherein the low-level security policy includes a specific security service, and wherein the specific security service includes at least one of a firewall, a web filter, a deep packet inspection, a DDoS-attack mitigation, and an anti-virus.

6. The I2NSF system of claim 4, wherein the I2NSF system applies a network management or verification facility by a decentralized audit system, and wherein a blockchain technology is applied to the decentralized audit system.

* * * * *